US008848324B2

(12) United States Patent
Fullington et al.

(10) Patent No.: US 8,848,324 B2
(45) Date of Patent: Sep. 30, 2014

(54) APPARATUS AND METHOD FOR DISABLING THE OPERATION OF HIGH POWER DEVICES

(71) Applicant: Rockwell Automation Technologies, Inc., Mayfield Heighs, OH (US)

(72) Inventors: David G. Fullington, Milwaukee, WI (US); Raymond G. Sladky, Grafton, WI (US); Daniel L. Stewart, Mequon, WI (US); Michael L. Gasperi, Racine, WI (US); Scott P. Miles, Oak Creek, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/032,960

(22) Filed: Sep. 20, 2013

(65) Prior Publication Data
US 2014/0021896 A1    Jan. 23, 2014

Related U.S. Application Data

(62) Division of application No. 10/730,430, filed on Dec. 8, 2003, now Pat. No. 8,593,768.

(51) Int. Cl.
*H02H 5/04* (2006.01)
*H02H 7/08* (2006.01)
*H02M 7/5387* (2007.01)
*H02P 29/02* (2006.01)
*H02M 1/32* (2007.01)
*H02M 1/092* (2006.01)
*H02P 6/14* (2006.01)
*G05B 9/02* (2006.01)

(52) U.S. Cl.
CPC .............. *H02P 6/14* (2013.01); *H02M 7/53875* (2013.01); *H02P 29/02* (2013.01); *H02M 1/32* (2013.01); *H02M 1/092* (2013.01)
USPC .............................. 361/23; 318/563; 318/801

(58) Field of Classification Search
CPC ........................................................ H02M 1/32
USPC ............................................................ 361/23
See application file for complete search history.

(56) References Cited

U.S. PATENT DOCUMENTS 4,247,189 A * 1/1981 Date et al. ..................... 396/406
4,630,210 A * 12/1986 Salazar et al. .................. 700/63

(Continued)

FOREIGN PATENT DOCUMENTS

DE    102 06 107 A1    9/2002
DE    102 07 834 A1    9/2002

(Continued)

OTHER PUBLICATIONS

R. Kennel, G. Kobs, R. Weber, "Digital Control of Industrial Servo Drives for Machine Tools", 8th European Conference on Power Electronics and Applications (EPE), Lausanne, 1999, Proceedigns, CD-ROM EPE '99, paper No. 882.

*Primary Examiner* — Jared Fureman
*Assistant Examiner* — Lucy Thomas
(74) *Attorney, Agent, or Firm* — Boyle Fredrickson, S.C.

(57) ABSTRACT

A drive circuit for delivering high-level power to a load, and method of stopping a high power load from operating, are disclosed. The drive circuit includes a high power circuit capable of being coupled to the load and delivering the high level power thereto, and a to power circuit that controls the high power circuit. The low power circuit includes a first circuit portion that provides at least one control signal that is at least indirectly communicated to the high power circuit and that controls the delivering of the high level power by the high power circuit, and a second circuit portions coupled to the first circuit portion. The second circuit portion is capable of disabling the first circuit portion so that the at least one control signal avoids taking on values that would result in the high power circuit delivering the high level power to the load.

17 Claims, 3 Drawing Sheets

(56) References Cited

U.S. PATENT DOCUMENTS

| | | | |
|---|---|---|---|
| 4,637,547 A * | 1/1987 | Hiniker et al. | 239/1 |
| 5,764,024 A | 6/1998 | Wilson | |
| 5,806,440 A | 9/1998 | Rowlette et al. | |
| 5,828,200 A * | 10/1998 | Ligman et al. | 318/807 |
| 5,904,666 A | 5/1999 | DeDecker et al. | |
| 5,998,884 A * | 12/1999 | Kitamine et al. | 307/10.1 |
| 6,208,536 B1 | 3/2001 | Boesche et al. | |
| 6,239,566 B1 * | 5/2001 | Tareilus et al. | 318/379 |
| 6,495,986 B2 * | 12/2002 | Schwesig | 318/801 |
| 6,570,355 B2 | 5/2003 | Morita et al. | |
| 6,573,672 B2 | 6/2003 | O'Rourke et al. | |
| 6,573,681 B2 | 6/2003 | Schwesig | |
| 6,745,083 B2 | 6/2004 | Eckardt et al. | |
| 6,775,115 B2 | 8/2004 | Sato | |

FOREIGN PATENT DOCUMENTS

| | | |
|---|---|---|
| EP | 1 211 77 4 A1 | 11/2001 |
| WO | WO 2004/059812 | 12/2003 |
| WO | WO 2004/059828 | 12/2003 |

* cited by examiner

APPARATUS AND METHOD FOR DISABLING THE OPERATION OF HIGH POWER DEVICES

CROSS-REFERENCE TO RELATED APPLICATIONS

This application is a divisional of U.S. patent application Ser. No. 10/730,430, filed Dec. 8, 2003, which is hereby incorporated by reference for all purposes.

FIELD OF THE INVENTION

The present invention relates to drive circuits that are used to control the delivery of high power levels to high power loads such a motors and more particularly, to the disabling of the power delivered by of such drive circuits so that the loads are no longer driven.

BACKGROUND OF THE INVENTION

High power devices are commonly employed in a variety of environments including, for example, industrial facilities and construction environments. High power devices generally include a variety of different devices including, for example, motors and heating devices. Although the operation of such de ices under normal conditions does not pose undue risk, there are circumstances in which such devices must be reliably disabled so as not to pose risks to human beings or other devices.

For example, high power motors often rotate at high speeds and/or provide significant torques that in certain situations could pose risks to human beings or other devices that come into contact with the motors themselves or with other devices coupled to those motors. In particular, when such motors or devices coupled to those motors are replaced, fixed, modified, tested or otherwise operated upon b human beings such as engineers or service technicians, it is desirable that the motors be reliably disabled such that the motors cease, to rotate or deliver sustained torque.

In view of the possible hazards associated with hi power devices generally, many modern industrial and other facilities employ various electronic and other technologies that reduce the risk of accidents and enhance overall system safety. Additionally, standards have been developed with a goal of further reducing the risk of accidents. For example, with respect to industrial facilities, standards from organizations such as the NFPA, ISO, CEN, CENELEC, and the IEC have been developed to establish requirements for safety. The technologies used to enhance system safety often are designed to comply with, or to assist in making a facility compliant with, standards from one or more of these organizations.

Some of the technologies employed to enhance system safety are designed to reliably disable high power devices. For example, technologies such as high power contactors are often used to couple and decouple the driven devices to and from their high power drive circuits. Such contactors often include multiple, redundant high power contacts that are physically coupled to one another in such a way that, if one or more of the contacts become locked/welded in position, a signal is provided indicating that a fault has occurred. The signal can be, for example, the turning on of an indicator light at an operator interface or simply the failure of the high power device to start operating when commanded to do so.

Such high power contactors are often used because of their relative technical simplicity and reliability. Nevertheless, high power contactors are disadvantageous insofar as they are relatively expensive, and physically large and bulky. Further, in certain circumstances, the disconnecting and connecting procedures for implementing these high power contactors can be complicated and/or time consuming. Consequently, the implementation of such high power contactors can negatively impact the overall efficiency of an industrial or other system in which the high power devices are employed.

Because of these disadvantages, efforts have been made to find other mechanisms that could be used to disable high power devices. One alternate method of disabling a high power motor that has been attempted, for example, has involved disabling high power transistors of a drive circuit that deliver the high levels of power to the motor. However, this method has thus far proven to be insufficiently reliable.

Therefore, it would be advantageous if a new mechanism could be developed that allowed for reliable disabling of high power devices such that the high power devices could not inadvertently start operating in a manner that might present a hazard. In particular, it would be advantageous if the new mechanism could avoid the disadvantages associated with using high power contactors in between the high power drive circuits and the driven devices, and at the same time was equally or even more reliable than such high power contactors (or other conventional technologies). Further, it would be advantageous if the new mechanism was relatively easy and inexpensive to implement.

SUMMARY OF THE INVENTION

The present inventors have recognized that, in some circumstances, high power loads are satisfactorily disabled such that the loads stop moving Or otherwise operating, regardless of whether high power levels of some sort continue to be provided to the loads. Indeed, in some of these circumstances, for example, the load is only capable of operating if it receives carefully controlled power levels that vary in time in addition to being of high magnitude. With this in mind, the present inventors have additionally recognized that in these circumstances it would be possible to disable the operation of the loads simply by ceasing to provide the control signals that govern the time-variation of the power. Further, the present inventors have recognized that, in situations where the drive circuits providing high power to their loads include both high power drive sections and low power logic sections that provide control signals to the high power drive sections to govern the delivery of power, the disabling of the loads can be achieved simply by setting the control signals of low power logic sections to low-level for other disabling) values.

In particular, the present invention relates to a drive circuit for delivering high-level power to a load. The drive circuit includes a high power circuit capable of being coupled to the load and delivering the high level power thereto, and a low power circuit that controls the high power circuit. The low power circuit includes a first circuit portion that provides at least one control signal that is at least indirectly communicated to the high power circuit and that controls the delivering of the high level power by the high power circuit, and a second circuit portions coupled to the first circuit portion. The second circuit portion is capable of disabling the first circuit portion so that the at least one control signal avoids taking on values that would result in the high power circuit delivering the high level power to the load.

The present invention additionally relates to a high power drive circuit for delivering power to a motor. The high power drive circuit includes first means for delivering high power to the motor, second means for generating low power control signals for the first means, and third means for disabling the second means so that the low power control signals take on values that would tend to cause the first means to stop delivering the high power to the motor.

The present invention also relates to a method of stopping a high power load from operating, where the high power load receives power from a drive circuit having a high power drive section and a low power logic section, and where the low power logic section provides a control signal to the high power drive section and the high power drive section during normal operation provides the power to the high power load in response to the control signal. The method includes receiving a command to stop the high power load from operating, and switching a status of at least a first component of the low power logic section in response to the command. The switching of the status affects one of the first component and a second component of the low power logic section so that the control signal provided by the low power logic section takes on a value that would tend to cause the high power drive section to cease providing, the power to the high power load. The method further includes ceasing to provide the power to the high power load in response to the control signal taking on the value.

The present invention additionally relates to a drive circuit for delivering high-level power to a load. The drive circuit includes a high power circuit capable of being coupled to the load and delivering the high level power thereto, and a low power circuit that controls the high power circuit, where the low power circuit includes a first circuit portion that provides at least one control signal that is at least indirectly communicated to the high power circuit and that controls the delivering of the high level power by the high power circuit. Further, the first circuit portion is at least one of coupled to, and adapted to be coupled to, a second circuit portion that is capable of providing to the first circuit portion at least one additional signal causing the first circuit portion to become disabled so that the at least one control signal avoids taking on values that would result in the high power circuit delivering the high level power to the load.

DETAILED DESCRIPTION OF THE INVENTION

Figure 1:
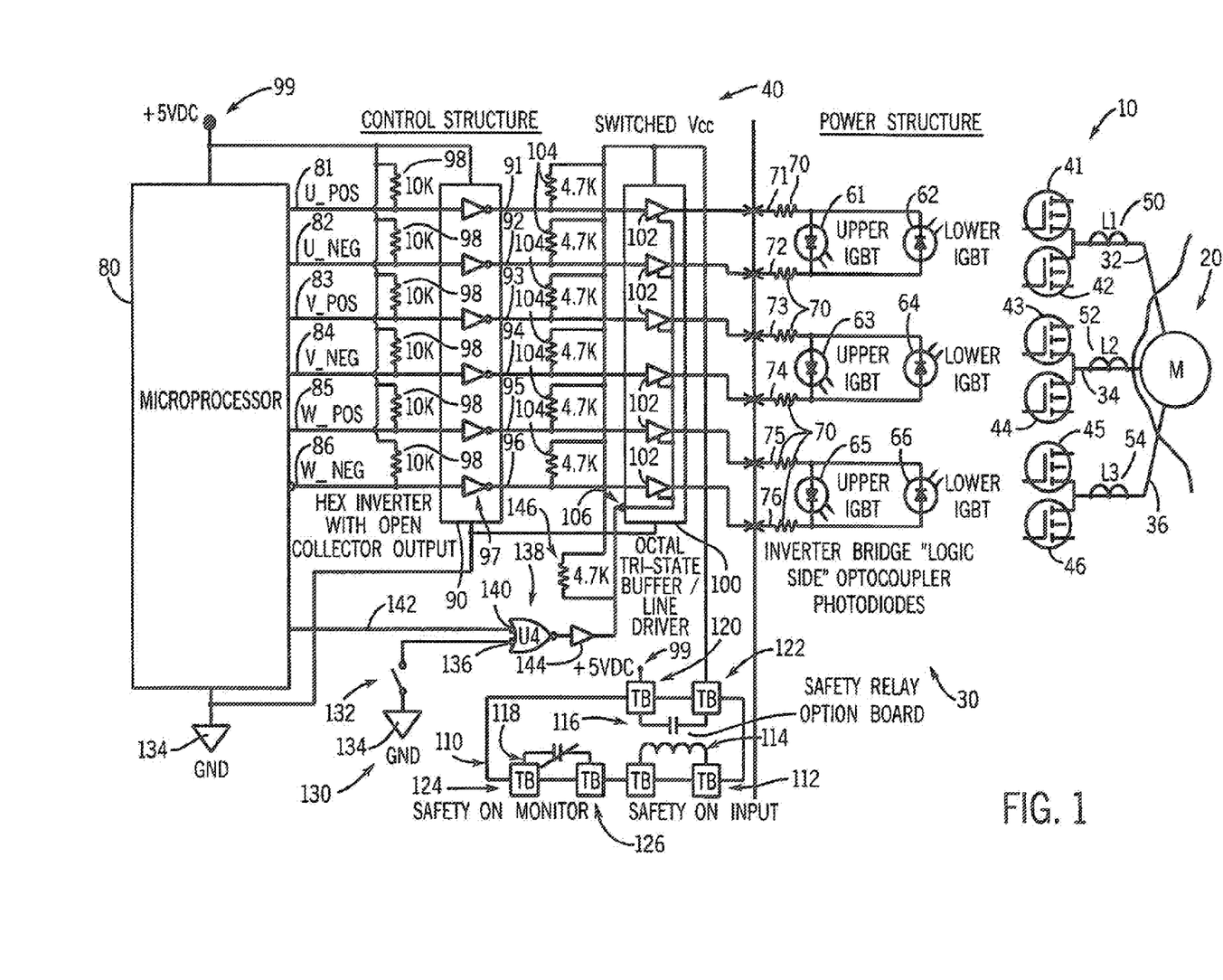
FIG. 1 is a schematic diagram of a first exemplary embodiment of a drive circuit coupled to a motor.

Referring to FIG. 1, an exemplary drive circuit 10 for providing high levels of power to a motor 20 is shown. The drive circuit 10 includes a high power drive section 30 and a low power logic section 40. The high power drive section 30 also can be termed a power structure, while the low power logic section 40 can be termed a control structure.

As shown, first, second and third phases of power 32, 34 and 36, respectively, are delivered to the motor 20 from six power transistor devices 41-46. In the present embodiment, each of the power transistor devices 41-46 is an insulated gate bipolar transistor (IGBT) although, in alternate embodiments, other types of power transistor devices (or other, non-transistor power delivery devices) can be used. Each of the first, second and third phases 32, 34 and 36 receives voltage from a respective pair of the power transistor devices 41-42, 43-44, and 45-46, respectively. Current flows toward or away from the motor 20 in each phase 32, 34, 36 depending upon which of the pair of corresponding power transistor devices is switched on. If neither of the power transistor devices of a given pair is on, no current flows toward or away from the motor in the corresponding phase. First, second and third coils 50, 52 and 54, respectively, are coupled in series between the motor 20 and each of the respective pairs of power transistor devices 41-42, 43-44 and 45-46. By virtue of the first, second and third coils 50, 52 and 54, the respective currents in each of the respective first, second and third phases 32, 34 and 36 can be sensed using conventional current sensing componentry (not shown).

Each of the power transistor devices 41-46 is electrically isolated from the remainder of the high power drive section 30 and the low power logic section 40. However, the switching on and off of the power transistor devices 41-46 is nevertheless governed by signals coming from the remainder of the high power drive section 30. As shown, the power transistor devices 41-46 are light sensitive devices that respond to light signals given off by six optocoupler photodiodes 61-66, respectively. The six photodiodes 61-66 are turned on and off based upon six control signals provided from the low power logic section 40, which are respectively provided by six control line outputs 71-76 of the low power logic section 40. More specifically, the six photodiodes 61-66 are themselves grouped into three pairs of photodiodes 61-62, 63-64 and 65-66, The photodiodes of each of the pairs are coupled in parallel with one another in opposite orientations, and the nodes linking the two photodiodes of each pair are then coupled to respective ones of the control line outputs 71-76 by way of respective resistors 70. Although shown as part of the high power drive section 30, the resistors 70 and photodiodes 61-66 are low power devices; they are considered to be part of the high power drive section insofar as they are in direct communication with the high power transistor devices 41-46, and insofar as in practice the photodiodes are typically (though not necessarily) mounted on the same circuit board as the power transistor devices rather than on a separate circuit board supporting the low power logic section. Depending upon the embodiment, the respective photodiodes 61-66 are devices that are physically separate from the respective power transistor devices 41-46 or, alternately, the respective photodiodes are packaged along with their corresponding power transistor devices 41-46 in an integrated manner.

Further as shown in FIG. 1, the low power logic section 40 includes a microprocessor 80 that is coupled to a hex inverter with open collector output 90, which in turn is connected to an octal tri-state buffer/line driver 100. The driver 100 outputs the control signals on the control line outputs 71-76 in response to six inverter signals provided by the hex inverter 90 on six inverter signal lines 91-96. The six inverter signals on lines 91-96 are provided by the inverter 90 in response to six microprocessor signals output by the microprocessor 80 on six microprocessor signal lines 81-86. Each of the microprocessor signal lines 81-86 is coupled not only to a respective input terminal on the hex inverter 90 but also is coupled to a power supply 99 by way of a respective pull-up resistor 98. The power supply 99 is also coupled to the microprocessor 80 to provide power thereto. In the present embodiment, the power supply for the low power logic section 40 is a positive 5 volt DC power supply, and each of the pull-up resistors 98 is a 10 kΩ resistor. The hex inverter 90 essentially consists of six inverter components 97, each of which inverts a respective one of the microprocessor signals provided by way of lines 81-86 to produce the inverter signals provided on lines 91-96, respectively.

During normal operation, the driver 100 merely acts as a buffer between the inverter signal lines 91-96 and the control line outputs 71-76. That is, the signal level of each respective control line output 71-76 is the same as the signal level of the corresponding inverter signal line 91-96. The buffering performed by the driver 100 is provided by way of six huller components 102 within the line driver 100, each of which is coupled respectively between a respective one of the control line outputs 71-76 and its corresponding inverter signal line 91-96. Further, because during normal operation the inverter 90 merely inverts the signals output by the microprocessor 80 along lines 81-86, the signals output by the driver 100 on the control line outputs 71-76 during normal operation have values that are opposite/inverted relative to the values of the signals on the lines 81-86.

The driver 100 does not, however, output signals on lines 71-76 that are the same as those on lines 91-96 and inverted relative to those on lines 81-86 in all circumstances. Rather, the driver 100 only outputs the correct signals on lines 71-76 in response to the inverter signals on lines 91-96 if three conditions are met. First, power must be provided to the driver 100. Second, each of the lines 91-96 is coupled to a respective pull-up resistor 104, and each of these pull-up resistors must in turn be provided with power. In the embodiment shown, the power supply to which the resistors 104 are coupled can again be a positive 5 volt DC power supply, and each of the pull-up resistors 104 can have a value of 4.7 kΩ. Third, power must be provided to an enable input 106 of the driver 100, which in turn results in the enabling of each of the buffer components 102, If any of these conditions are not met, the driver 100 ceases to consistently provide signals on lines 71-76 that are the same as the signals on lines 91-96 and inverted relative to the signals on lines 81-86, and instead the signals output by the driver each take on a zero value or effectively-zero value in which no current is conducted to any of the photodiodes 61-66.

The failure to meet any one of these conditions results in the control line outputs 71-76 being nonconductive for the following reasons. If the power supply is decoupled from the pull-up resistors 104, then currents will not flow through those resistors 104 when the inverter signal lines 91-96 take on a zero value. Further, because the inverter 90 is an open collector output device, the absence of power being supplied to the pull-up resistors 104 causes the six inverter components 97 of the inverter to enter high impedance, indeterminate states. While the inverter components 97 are in these indeterminate states, they are unable to take on high voltage values, and consequently, the lines 91-96 and input terminals of the buffer components 102 of the driver 100 remain at zero volts. Likewise, if the power supply 99 is entirely decoupled from the driver 100 itself, the buffer components 102 are unable to output nonzero currents on the control output lines 71-76. Further, if a zero voltage level is applied to the enable input 106 of the driver 100, then each of the buffer components 102 likewise is unable to provide a nonzero current on any of the control output lines 71-76.

In accordance with one embodiment of the present invention, these features of the low power logic section 40 are employed to provide two redundant mechanisms for shutting down the low power logic section such that none of the power transistor devices 41-46 is commanded by any of the photodiodes 61-66 to deliver high power to the motor 20. Specifically, a first mechanism for shutting down the low power logic section 40 involves a safety relay circuit 110 that governs whether the power supply 99 is coupled to each of the pull-up resistors 104 as well as to the driver 100 itself. As shown, the safety relay circuit 110 includes a safety on input 112 that includes a coil 114. So long as a predetermined voltage level is applied across the coil 114 (for example, 24 volts), a normally-open contact 116 within the safety relay circuit 110 is closed and a second, normally-closed contact 118 within the safety relay circuit is opened. The closing of the normally-open contact 116 links first and second ports 120, 122 of the safety relay circuit 110 so that the power supply 99, which is coupled to the first port 120, is in turn coupled to the pull-up resistors 104 and the driver 100 itself, each of which are coupled to the second port 122. However, if the necessary voltage is no longer applied across the coil 114, then the power supply 99 is decoupled from both the pull-up resistors 104 and the driver 100 itself, thus causing the control output lines 71-76 to shut off and provide no voltage. Therefore, by applying or not applying a voltage across the coil 114 of the safety relay circuit 110, an operator can thereby determine whether the signals on control line outputs 71-76 reflect the microprocessor signals on lines 81-86 to provide normal control of the motor 20, or take on null values such that the power transistor devices 41-46 do not provide voltage to the motor 20.

The present embodiment is further designed to allow for the detection of faults in the safety relay circuit 110. Specifically, a safety on monitor can also be coupled to third and fourth ports 124, 126 of the safety relay circuit 110, between which is coupled the normally-closed contact 118. The safety relay circuit 110 is configured such that the normally-open contact 116 and normally-closed contact 118 are physically coupled so that only one or the other of the contacts can be closed at any given time. Consequently, if the voltage applied across the coil 114 is turned off and the normally-open contact 116 remains closed, then the normally-closed contact 118 remains open and thus the safety on monitor can determine that a fault has occurred due to the open-circuiting of the third and fourth ports 124, 126 and the information that the voltage has been disconnected from the coil 114. Conversely, if the normally-closed contact 118 becomes welded, then the normally-open contact 116 cannot close despite the providing of voltage across the coil 114, and consequently the driver 100 cannot provide nonzero signals on the control line outputs 71-76.

In addition to the control capability provided by way of the safety relay circuit 110 in terms of controlling whether power is provided to the pull-up resistors 104 and to the driver 100, the embodiment of FIG. 1 also includes additional logic circuitry 130 that determines whether the enable input 106 of the driver 100 is asserted. As shown, the additional logic circuitry 130 includes a hardware switch 132 that is coupled between ground 134 (which is also coupled to appropriate grounding terminals on the microprocessor 80, the inverter 90 and the driver 100) and a low-true input 136 of a NOR gate 138. A second low-true input 140 of the NOR gate 138 is coupled to the microprocessor 80 by way of a control line 142, such that the microprocessor can also provide an input to the NOR gate. The output of the NOR gate 138 is coupled to a buffer component 144, which in turn is coupled to the enable input 106 and also to a further pull-up resistor 146. The further pull-up resistor 146 is coupled to the power supply 99 by way of the same line as the other pull-up resistors 104, such that power is only supplied when the normally-open contact 116 of the safety relay circuit 110 is closed. The buffer 144 acts as an open collector output such that a positive, non-zero output can only be applied to the enable input 106 of the driver 100 if power is supplied to the pull-up resistor 146, that is, only if the normally-open contact 116 of the safety relay circuit 110 is closed.

Given this design, the enable input 106 only receives a positive, non-zero value such that the driver 100 is capable of outputting non-zero output signals on the control line outputs 71-76 if the normally-open contact 116 of the safety relay circuit 110 is closed and at least one of the hardware switch 132 is closed or the microprocessor 80 provides a zero-level control signal via the control line 142 to the inverter 140. Thus, even if the safety relay circuit 110 is actuated such that power is provided to each of the driver 101) and the pull-up resistors 104, 146, it is possible for either of the microprocessor 80 or an operator, by way of opening the switch 132, to disable the driver 100 such that each of the control line outputs 71-76 takes on a zero or effectively-zero When implemented as shown in FIG. 1, the drive circuit 10 provides multiple, redundant avenues by which an operator or other control entity can cause the drive circuit to provide zero-level control signals via the control line outputs 71-76 to the photodiodes 61-66 such that the motor 20 ceases to receive power from the power transistor devices 41-46. While it is possible that a human operator may trigger one or both of the hardware switch 132 or the safety on input 112 of the safety relay circuit 110, the present embodiment also envisions the coupling of these inputs to other components such as an additional safety relay circuit that would be capable of providing a command to each of these inputs (such a safety relay circuit could, for example, be present in a factory environment). That is, the present embodiment is intended to be capable of being implemented in conjunction with a variety of other devices in a manner allowing those other devices to control whether the drive circuit 10 is disabled.

The circuitry of the drive circuit 10 also is sufficiently redundant that it satisfies requirements of Category 3 of the EN 954-1 standard, which requires that no single fault in any part of the drive circuit 10 would lead to a loss of the ability to cease providing control signals such that the motor 20 might develop sustained torque. As discussed above, a failure of one of the contacts of the safety relay circuit 110 can be detected by way of the safety on monitor. In the case of the actuation of the switch 132 or a microprocessor command provided by way of the control line 142, a failure of the signals on control line outputs 71-76 to become null in response to such activation/command can be sensed by way of the coils 50, 52 and 54. That is, if the switch 132 is open, or the microprocessor 80 is providing a zero-level signal on the control line 142, then none of the coils 50, 52, 54 should experience any current and, if current is sensed, a warning signal is generated. In certain embodiments, the sensed current information obtained by way of the coils 50, 52 and 54 is provided to and used by the microprocessor 80.

The fact that the drive circuit 10 satisfies Category 3 of the EN 954-1 standard is not meant to indicate that the drive circuit 10 guarantees that electrical voltage is not provided to the motor 20. Indeed, despite the nullification of the control line outputs 71-76, it is still conceivable that one or more of the power transistor devices 41-46 would apply voltage to the motor 20. Rather, because the motor 20 can only develop sustained rotation and torque if the power transistor devices 41-46 apply voltage at specific times in a pulse width modulated (PWM) manner determined by the microprocessor 80, inadvertent conduction of currents by any of the power transistor devices 41-46 would only, at most, cause the motor to experience a one-time movement of a limited number of degrees, such as 180 degrees for a two-pole motor or 90 degrees for a four-pole motor. If the motor 20 is running when either the safety on input 112 is triggered or the enable input 106 receives a low level signal due to the triggering of the switch 132 or a signal from the microprocessor 80, the motor 20 will coast to a standstill. The safety relay circuit input to the driver 100 prevents power from being provided to the control line outputs 71-76, while the actuation of the enable input 106 of the driver 100, as actuated by the switch 132 or the microprocessor 80 by way of the control line 142, acts as a logic inhibit of the control line outputs.

Figure 2:
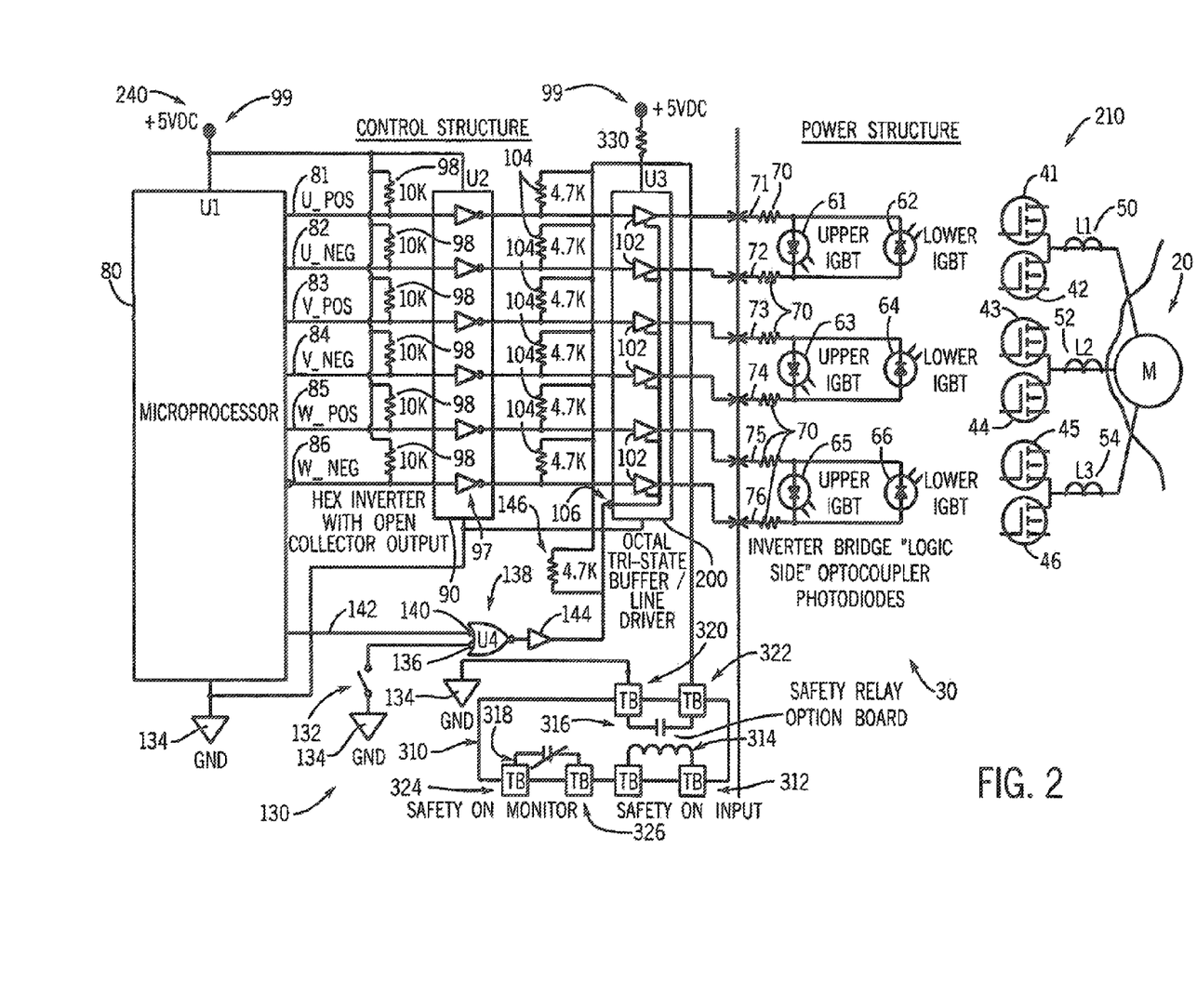
FIG. 2 is a schematic diagram of a second exemplary embodiment of a drive circuit coupled to a motor.

Turning to FIG. 2, an alternate embodiment of a drive circuit 210 that somewhat differs from the drive circuit 10 of FIG. 1 is shown coupled to the motor 20. The drive circuit 210 does include the same high power chive section 30 as the drive circuit 10, and a low power logic section 240 of the drive circuit includes the same microprocessor 80, inverter 90, pull-up resistors 98, 104 and 146, and additional logic circuitry 130 as the low power logic section 40. As in the case of drive circuit 10, the additional logic circuitry 130 provides signals to an enable input 106 of an octal tri-state buffer/line driver 200 of the logic circuit 240. However, the logic circuit 240 differs from the logic circuit 40 in that the driver 200 of the logic circuit 240 is not coupled to the power supply 99 by way of any safety relay. Further, a safety relay circuit 310 that is employed in the low power logic section 240 is essentially an inverted version of the safety relay circuit 110. Namely, the safety relay circuit 310 includes first and second ports 320 and 322 that are respectively coupled to the ground 134 and to the pull-up resistors 104 and 146, with a normally-closed contact 316 coupled between those ports. Also, third and fourth ports 324 and 326 of the safety relay circuit 310 have a normally-open contact 318 coupled between them. Further, the power supply 99 is coupled to the pull-up resistors 104 and 146 and to the second port 322 by a low-level resistance (in this example, a 330 ohm resistor).

Consequently, when a safety on input is provided to the safety relay circuit 310 such that a coil 312 within the safety relay circuit is actuated, the normally-closed contact 316 is opened such that the power supply 99 is effectively connected to the pull-up resistors 104, 146, thereby allowing the driver 200 to receive non-zero signals from the inverter 90. However, when the safety on input is not provided to the safety relay circuit 310, the pull-up resistors 104 and 146 are coupled to ground, thereby preventing the driver 200 from outputting non-zero signals on the control line outputs 71-76. As in the case of the safety relay circuit 110, the normally-closed contact 316 and normally-open contact 318 of the safety relay circuit 310 are physically coupled such that only one of the contacts can be closed at any given time, such that a welding of either of the normally-closed and normally-opened contacts can be detected. In comparison with the drive circuit 10 of FIG. 1, the drive circuit 210 of FIG. 2 is somewhat simpler to implement and for that reason is somewhat preferred for that reason, albeit the embodiment of FIG. 1 satisfies certain standards that may not be satisfied by the circuit of FIG. 2.

Figure 3:
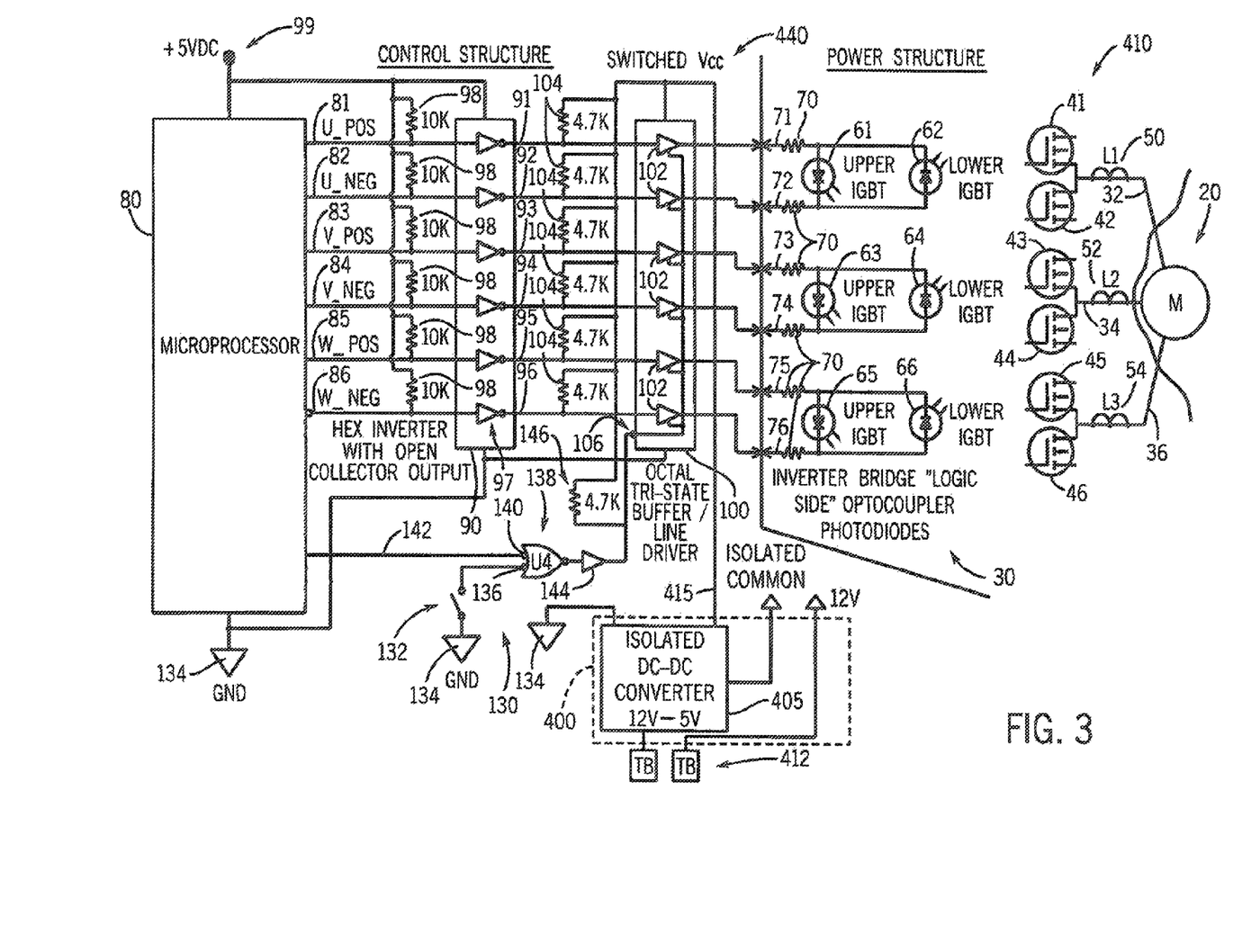
FIG. 3 is a schematic diagram of a third exemplary embodiment of a drive circuit coupled to a motor.

Referring to FIG. 3, yet a third embodiment of the present invention shows a drive circuit 410 having components identical to the drive circuit 110 except insofar as the safety relay circuit 110 has been replaced with a circuit 400 that includes a DC-to-DC conversion circuit 420. In this embodiment, it is envisioned that another device (not shown) such as another safety relay circuit provided by a third party would be coupled to input terminal 412 of the circuit 400. The circuit would then convert power signals provided by that other device into an output signal 415 that would govern the voltage applied to the pull-up resistors 104, 146 and the power supplied to the driver 100. By using a DC-to-DC conversion circuit such as that shown, the input signals at the input terminal 412 would be isolated from the output signal 415, and the input signals could differ in their voltage range from that required by the driver 100 in an arbitrary manner (in the embodiment shown, for example, the input signals 412 can range from 0 to 12 Volts signals, while the output signal 415 can range from 0 to 5

Volts). Although the embodiment of FIG. 3 shows a DC-to-DC conversion circuit that provides electrical isolation, in alternate embodiments, opto-isolators or other devices could be employed to provide isolation. A DC-to-DC conversion device is advantageous insofar as it provides a reliable shutdown mechanism since it cannot operate without power being applied.

Although three embodiments of the present invention are shown in FIGS. 1-3, the present invention is not intended to be limited to these particular electrical circuits. Rather, the present invention is intended to encompass a variety of electrical and other control circuits in which the delivery of high power levels to a high power device is governed in part by low power circuitry, and in which there are one or more control mechanisms for disabling the low power circuitry to effectively stop the operation of the high power device without taking any action to disable or disconnect the high power drive circuit devices that are directly coupled to that high power load. Indeed, the present invention is intended to encompass any such dual-stage drive circuits in which disablement occurs via the low power stage, regardless of the type of high power load that those drive circuits are powering.

Also, the present invention is intended to encompass control/drive circuits that are formed from multiple distinct modules. For example, with respect to the embodiment of FIG. 2, all of the components of the drive circuit 210 need not be included on a single circuit board. Rather, in some embodiments, all of the low power logic circuit 240 of the drive circuit 210 of FIG. 2 would be included within a primary module except for the safety relay circuit 310, which could be implemented on an auxiliary module. In such an embodiment, the drive circuit 210 could be operated to control the high power drive circuit 30 and the motor 20 as normal without the auxiliary module. However, if the auxiliary module were coupled to the primary module (e.g., by way of appropriate connectors/adaptors), then it would be further possible to disable the drive circuit as discussed above by providing the safety on input and thereby coupling the pull-up resistors 104, 146 to the ground. A similar design could be employed in relation to the embodiments of FIGS. 1 and 3, particularly if a jumper was used to couple the pull-up resistors 104,146 and power input of the driver 100 to a power supply in the absence of the safety relay circuit 110 or the circuit 400. An auxiliary module including a safety relay circuit or other circuit such as circuits 110,310 and 400 could be implemented in a variety of manners, such as on a plug-in-module or as part of an external cable. Thus, the present invention is intended to encompass embodiments in which a main control device can be coupled to one or more other devices, which depending upon the embodiment might be required or optional (or even after-market) devices.

Although the terms "safety", "reliable", "safety system", "safety controller", and other related terms may be used herein, the usage of such terms is not a representation that the present invention will make an industrial or other process safe or absolutely reliable, or that other systems will produce unsafe operation. Safety in an industrial or other process depends on a wide variety of factors outside of the scope of the present invention including, for example: design of the safety system; installation and maintenance of the components of the safety system the cooperation and training of individuals using the safety system; and consideration of the failure modes of the other components being utilized. Although the present invention is intended to be highly reliable, all physical systems are susceptible to failure and provision must be made for such failure.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

What is claimed is:

1. A drive circuit for delivering high-level power to an AC motor, the drive circuit comprising:
 a high power circuit including a set of semiconductor switching devices capable of being coupled to the motor and delivering the high level power thereto;
 a logic circuit generating signals to control the semiconductor switching devices;
 a low power circuit to transmit the signals from the logic circuit to the high power circuit only when the low power circuit is receiving electrical power; and
 a safety relay having a contact connected to a power terminal of the low power circuit to control the application of power to the low power circuit, wherein the safety relay couples the power terminal of the low power circuit to ground to disable the low power circuit, and wherein the safety relay is electrically isolated from the logic circuit;
 wherein the safety relay is coupled to a pull-up resistor of the low power circuit, wherein the safety relay further disables the low power circuit by at least one of coupling the pull-up resistor to ground and decoupling the pull-up resistor from a power supply;
 wherein the safety relay is coupled to an override port of the low power circuit, and wherein the safety relay disables the power circuit by providing a first signal to the override port of the low power circuit.

2. The drive circuit of claim 1, wherein providing the first signal to the override port tri-states the output of the low power circuit.

3. The drive circuit of claim 1, wherein the safety relay includes a hardware switch that is capable of being switched between first and second states, and wherein, when the switch is switched in the first state, the safety relay provides the first signal to the override port of the low power circuit.

4. The drive circuit of claim 3, wherein the high power circuit includes at least one coil that outputs a signal indicative of a current delivered by the high power circuit to the motor, and wherein a determination is made regarding whether the signal indicative of the current is proper when the switch is switched in the first state.

5. The drive circuit of claim 1, wherein the power terminal of the low power circuit is connected to the power supply via a low-level resistor having a resistance value less than the pull-up resistor.

6. The drive circuit of claim 1, wherein the semiconductor switching devices are insulated gate bipolar transistors.

7. The drive circuit of claim 1, wherein the semiconductor switching devices deliver first, second and third phases of power.

8. The drive circuit of claim 1, wherein the semiconductor switching devices are light sensitive devices that respond to light signals.

9. A drive circuit for delivering high-level power to an AC motor, the drive circuit comprising:
 a high power circuit including a set of semiconductor switching devices capable of being coupled to the motor and delivering the high level power thereto;
 a logic circuit generating signals to control the semiconductor switching devices;

a low power circuit to transmit the signals from the logic circuit to the high power circuit only when the low power circuit is receiving electrical power; and an isolation device having a terminal connected to a power terminal of the low power circuit to control the application of power to the low power circuit, wherein the isolation device couples the power terminal of the low power circuit to an externally provided signal having a first state, wherein communicating the first state is operable to disable the low power circuit, and wherein the isolation device is electrically isolated from the logic circuit;

wherein the isolation device is coupled to a pull-up resistor of the low power circuit, wherein the isolation device further disables the low power circuit by coupling the pull-up resistor to the externally provided signal communicating the first state;

wherein the isolation device is coupled to an override port of the low power circuit, and wherein the isolation device disables the lower power circuit by coupling the externally provided signal communication the first state to the override port of the low power circuit.

10. The drive circuit of claim 9, wherein the isolation device includes a DC-to-DC converter.

11. The drive circuit of claim 9, wherein the isolation device includes an optical isolator 12. The drive circuit of claim 9, wherein communicating the first state provides ground to the low power circuit.

13. The drive circuit of claim 9, wherein the voltage range of the externally provided signal differs from the voltage range for the application of power to the low power circuit.

14. The drive circuit of claim 13, wherein the voltage range of the externally provided signal is 0 to 12 Volts, and the voltage range for the application of power to the low power circuit is 0 to 5 Volts.

15. The drive circuit of claim 9, wherein coupling the externally provided signal communicating the first state to the override port tri-states the output of the low power circuit.

16. The drive circuit of claim 9, further comprising a hardware switch that is capable of being switched between first and second positions, and wherein, when the switch is switched in the first position, the isolation device couples the externally provided signal communicating the first state to the override port of the low power circuit.

17. The drive circuit of claim 16, wherein the high power circuit includes at least one coil that outputs a signal indicative of a current delivered by the high power circuit to the motor, and wherein a determination is made regarding whether the signal indicative of the current is proper when the switch is switched in the first state.

* * * * *

UNITED STATES PATENT AND TRADEMARK OFFICE
CERTIFICATE OF CORRECTION

| | |
|---|---|
| PATENT NO. | : 8,848,324 B2 |
| APPLICATION NO. | : 14/032960 |
| DATED | : September 30, 2014 |
| INVENTOR(S) | : David G. Fullington et al. |

It is certified that error appears in the above-identified patent and that said Letters Patent is hereby corrected as shown below:

IN THE CLAIMS

CLAIM 1, Col. 10, Line 33, delete "the power circuit" and substitute therefore

-- the low power circuit --

Signed and Sealed this
Twenty-fourth Day of March, 2015

Michelle K. Lee
*Director of the United States Patent and Trademark Office*